March 18, 1958  C. W. LINCOLN ET AL  2,827,123
POWER STEERING GEAR
Filed March 28, 1955  3 Sheets-Sheet 1
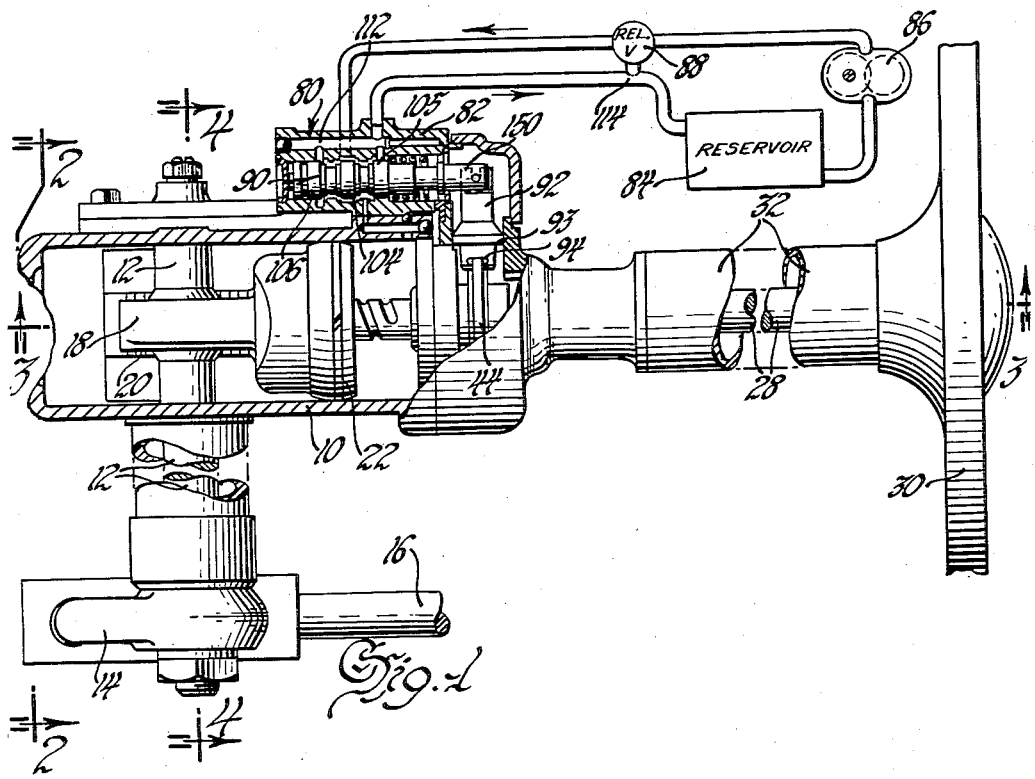
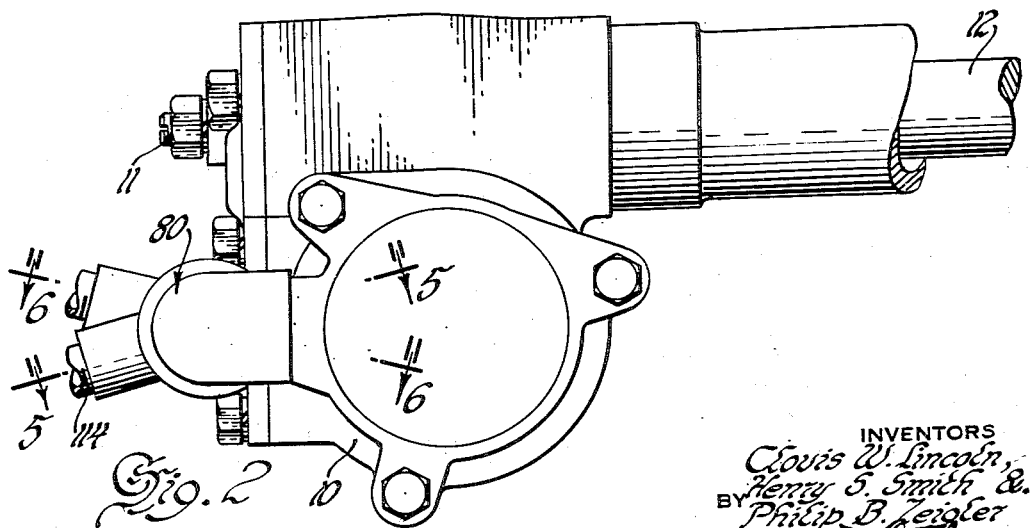
INVENTORS
Clovis W. Lincoln,
Henry S. Smith &
Philip B. Zeigler
BY
ATTORNEY

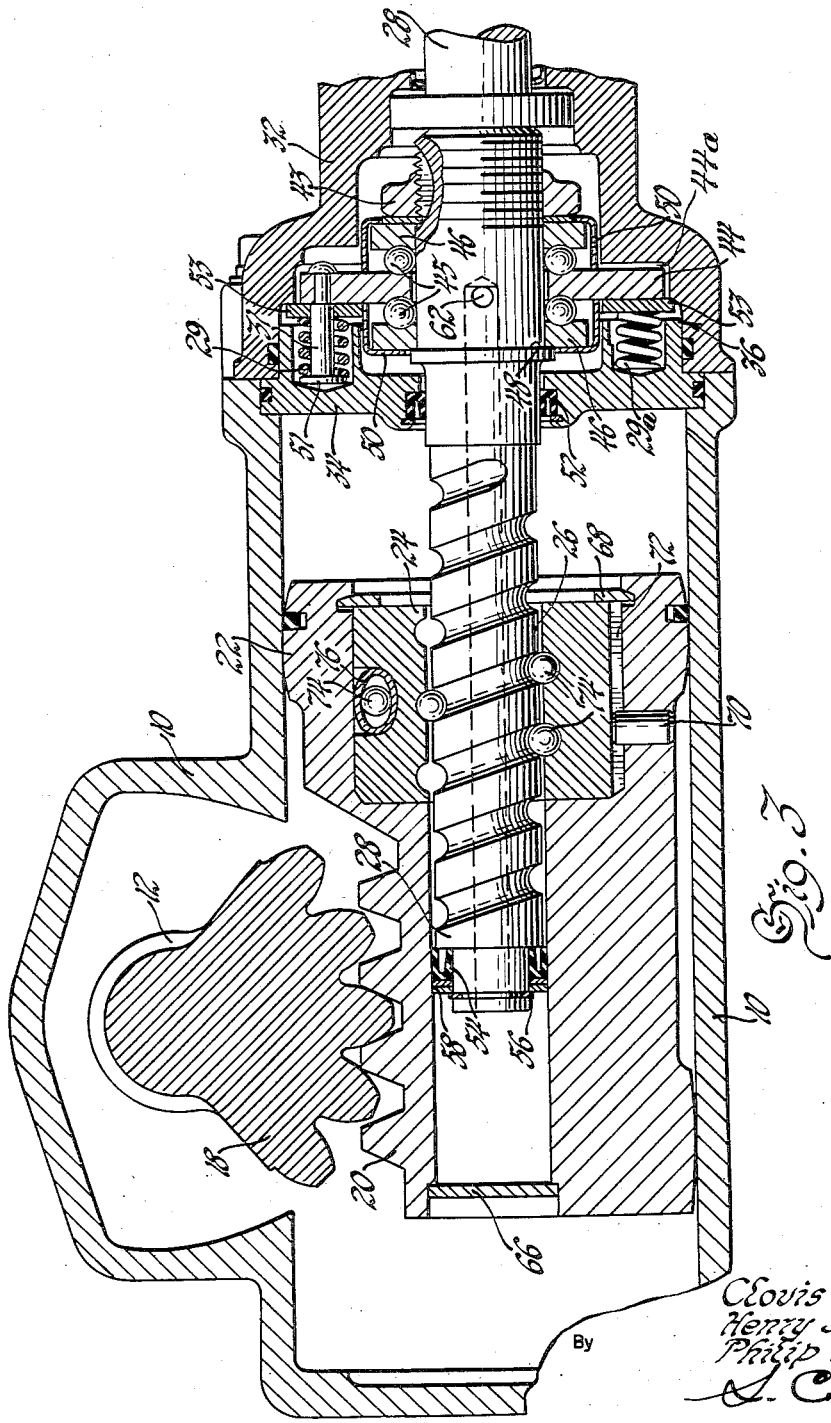

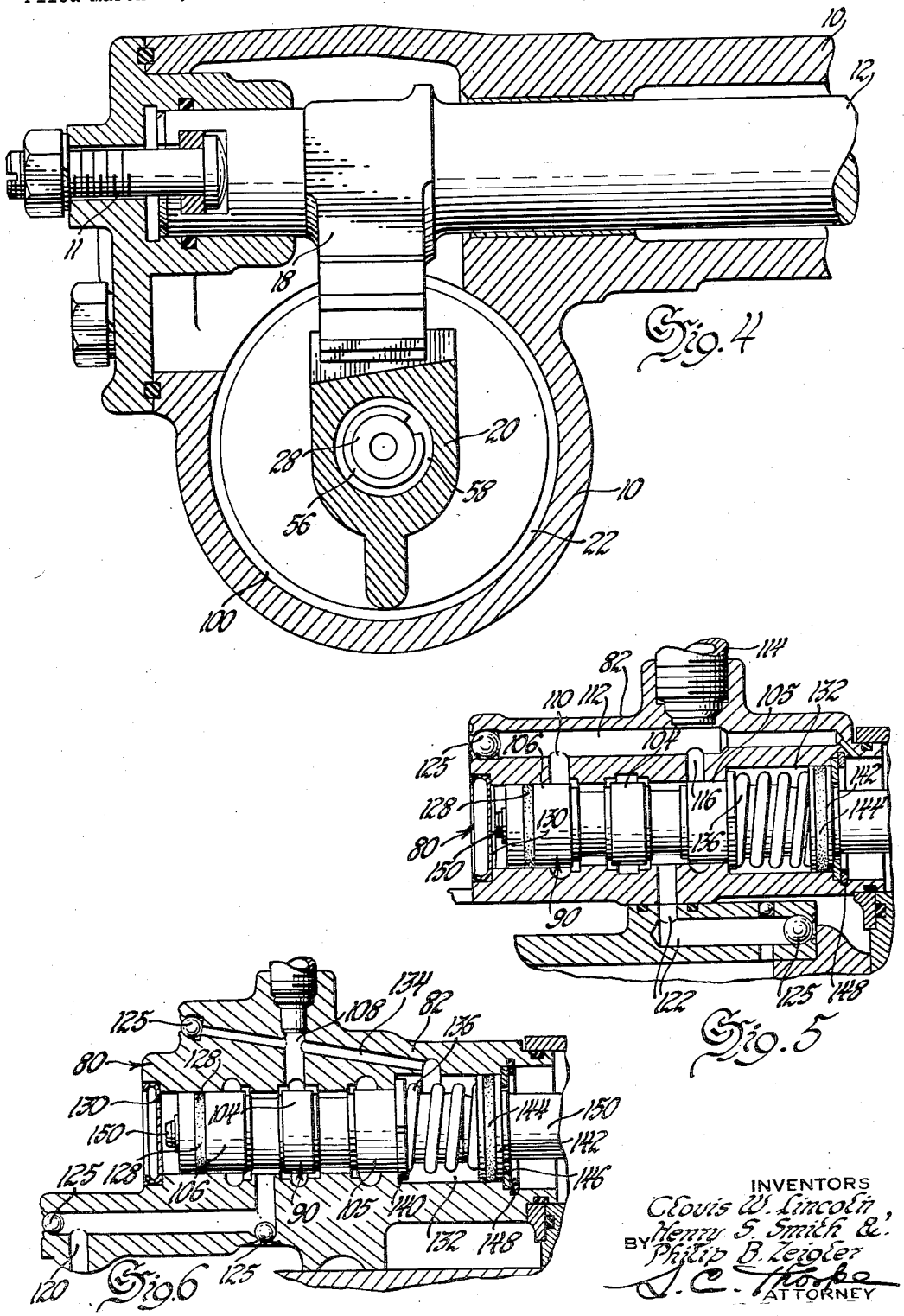

United States Patent Office 2,827,123
Patented Mar. 18, 1958

2,827,123

POWER STEERING GEAR

Clovis W. Lincoln, Henry S. Smith, and Philip B. Zeigler, Saginaw, Mich., assignors to General Motors Corporation, Detroit, Mich., a corporation of Delaware Application March 28, 1955, Serial No. 497,154

3 Claims. (Cl. 180—79.2)

This invention relates to fluid power steering and more particularly concerns a hydraulic power steering gear of unique construction and operation.

The increasing number of accessory devices with which automobiles are being equipped presents a very real problem to engineers and designers charged with finding room for the accessories and the associated equipment. The problem is complicated by the fact that in most cases either the accessory itself or some related part must by practical necessity be located under the engine hood or bonnet. In such a circumstance, any new accessory of the type associated with normal or standard equipment so as to modify or improve the operation thereof, if ideally designed, would not substantially increase space requirements over those pre-existing.

As indicated, our invention has as its principal object to provide power steering apparatus of such character that it may be built into a standard steering gear, so to speak, without substantially increasing the over-all dimensions of the gear.

A corollary object of the invention is to accomplish the foregoing object without any sacrifice in operating characteristics and efficiency.

Still other objects and features of the invention will be apparent from the following description of a preferred embodiment thereof. The description will proceed with reference to the accompanying drawings in which:

Figure 1 is a broken plane view in which certain parts appear in section;

Figure 2 is a view taken on the line 2—2 in Figure 1;

Figure 3 is a longitudinal section through the gear box;

Figure 4 is a section on the line 4—4 in Figure 1; and

Figures 5 and 6 are sections taken on the lines indicated in Figure 2.

In the drawings, and referring first to Figure 1, the numeral 10 denotes a casing or a gear box of generally cylindrical conformation. Disposed partly within such casing and extending at one side thereof is a cross or rock shaft 12 connected externally of the casing with a pitman arm 14 through which a drag link 16 is actuated. The linkage beyond the drag link may be assumed as conventional.

Fixed to or integral with the rock shaft 12, within the casing 10, is a gear sector 18 (Figure 4), the teeth of which mesh with those of a rack 20 formed integral with a piston 22 reciprocal within the casing. A screw device 11 (Figure 4) of known construction allows for the adjustment of lash between the teeth.

Piston 22 is bored and counterbored to accommodate a ball nut 24 and the worm end 26 of a control member or steering shaft 28 which terminates at its upper end (Figure 1) in the usual steering wheel 30.

Shaft 28 is shown as surrounded mediate the wheel 30 and the casing 10 by the usual tubular column or mast jacket 32. At its enlarged lower end column 32 is shouldered onto an adaptor plate 34 closing the upper end of the casing 10 (Figure 3) and partially confining a thrust bearing 36 for the shaft 28. This bearing includes an annular central race piece 44 for balls 45 which at installation are placed under a predetermined load by a nut 43 operating to force the lower of the outer race pieces 46, enveloped by retainers 60, into shouldering engagement with the shaft 28 at 48. Surrounding the lower race piece 46 and accommodated in recesses formed in the adapter 34 are two sets of springs 29 and 29a, these springs, of which there may be three apiece, for example, being alternately positioned around the adapter. Each spring 29 surrounds a corresponding rivet 31 secured to the central race piece 44 and having a flanged head 51. This flanged head and a washer 53 provide the seats for the spring. The washer 53 is spaced from the adapter 34 a distance equal to the spacing 44a between the central race piece 44 and the steering column 32. Springs 29a, as shown, seat directly against the adapter 34 and against the washer 53.

Steering shaft 28, which is supported for limited axial movement, extends through a seal 52 in the adapter 34 and carries a seal 54 at its lower tip end, the latter seal being held in place via a lock ring 56 and retainers 58. The shaft has a central bore extending through the worm portion thereof and connecting with a short passageway 62 leading to the chamber within which the thrust bearing 36 is disposed. The purpose of these passageways is to bleed the cavity between the tip end of the worm portion of the shaft and the closure cap 66.

Ball nut 24 is held in place within the piston 22 via a lock ring 68. It is believed evident from this arrangement that relative axial movement, as between the nut and piston, is not possible. A pin 70 received in a keyway 72 formed in the nut prevents relative rotary movement of the two parts. Except for the keyway, the ball nut is substantially structurally identical to the conventional article well known in the art. In this circumstance, a detailed description thereof is believed unnecessary. Suffice it to say that as the steering shaft 28 is rotated, the nut, and with it the piston, tends to move axially of the casing 10 by reason of the helical ball connection interconnecting the shaft and nut. The balls 74 are returned from one end of the nut to the other via a return tube 76 appearing in section in Figure 3.

Reverting now to Figure 1, there will be seen a valve 80, the housing 82 of which is fixed to the casing 10. Such valve controls the flow of fluid, normally a mineral oil of suitable viscosity characteristics, between the casing 10, in effect a power cylinder, and a reservoir 84, illustrated diagrammatically. This reservoir serves a pump 86, discharging through a relief valve 88 which becomes effective to by-pass fluid to the reservoir whenever the pressure in the hydraulic circuit becomes excessive, damage to any of the component parts of the system being thereby prevented.

Valve 80 is of the so-called "open-center" type and comprises a spool 90 which is linked through a lever 92, rock-pivoted at 93, and through the previously mentioned race piece 44 to the steering shaft 28. Lever 92 is slotted at 94 to provide the connection with the race piece.

As well understood in the art, any substantial resistance of the rock shaft 12 to turning incident to the rotation of the steering shaft 28 will result in a reactionary thrust on the shaft 28 tending to impart axial movement thereto, the movement being downward in the instance of a right turn, upward in the case of a left turn. It is this reactionary axial movement which is utilized to bring about automatic actuation of the spool 90. That the bearing 36, including the race piece 44, partakes of any axial movement of the steering shaft 28 (occurring against the resistance of springs 29) should be obvious, considering the nature of the connection between the bearing and the shaft.

As best seen from Figures 5 and 6, spool 90 is formed with three lands 104, 105, and 106. With the spool centered in the housing 82, as shown, the stream of fluid entering the passageway 108 (Figure 6) from the pump is divided at the central land 104. The part diverted to the left flows about the spool to enter passageway 110 (Figure 5) which interconnects with a longer passageway 112 extending to the exhaust line 114 to the reservoir. Similarly, the part diverted to the right flows about the spool to the passageway 116 which also connects with the exhaust line. In either case, the flow of liquid is against the static pressure of the fluid contained in the casing 10, passageways 120 (Figure 6) and 122 being open, respectively, to the left and right-hand chambers of the casing. Now on movement of the spool in either direction, it should be clear that the fluid flow is partially or completely restricted to one or the other side of the valve, depending upon the direction of the movement. Thus, if the spool is displaced to the right, as is the case when the steering shaft reacts axially downwardly on a right turn, the consequent blocking off of the right side of the valve results in the building up of a pressure in the left-hand chamber of the casing 10, providing the desired power assist. With the spool so displaced, land 106 partially or completely seals off the left-hand chamber of the casing from the exhaust passageway 112, while the opposite chamber of the casing is necessarily open to such passageway to a greater extent than when the spool is in neutral position. Obviously, when the spool is displaced to the left rather than the right, the effect is just the reverse of that described.

It will be understood that balls 125 are merely plugs closing the ends of the bore holes.

Land 106 is of somewhat greater width than the other end land 105 and is grooved to accommodate a seal 128, preventing leakage past the cap piece 130 fitted into the valve housing. At the opposite end of the spool 90 is a chamber 132 which is open at all times to the inlet passageway 108, a diagonally disposed passageway 134 being provided for this purpose. Accordingly, the fluid pressure in such chamber always conforms to the maximum pressure in the system. This pressure, with the spring 136, presents a resistance to movement of the spool in either direction. In other words, the fluid pressure and the spring tend to maintain the valve spool centered at all times, a condition which incidentally operates to provide a sense of "feel" at the steering wheel 30. Significantly, the resistance sensed at the wheel is proportionate to the actual steering resistance, since the pressure in the chamber increases with the power demand.

It will be observed that spring 136 exerts its thrust against a left-hand seat 140 and a right-hand seat 142. The latter carries an oil seal 144 and abuts a stop ring 146, held in place by a ring 148 received in a groove formed in housing 82. The spool stem 150, through which the spool is linked to the previously mentioned lever 92, extends throughout the length of the spool which is made hollow to receive the stem.

It should be apparent that the centering action of the spring 136 is aided by the springs 29, 29a associated with the thrust bearing 36, this in view of the connection between the bearing and the valve spool. Thus, on upward reactionary movement of the steering shaft 28, springs 29, being seated against the washer 53, which is incapable of upward or rightward movement by virtue of its shouldering engagement with the steering column 22, must necessarily be compressed by force of the flanged heads 51. This resistance to the upward movement of the shaft 28 does not involve the springs 29a, which are effective only on downward reactionary movement of the shaft when the washer 53 is displaced. Springs 29 on the downward movement interpose no resistance, being carried along in their shown position between the washer and the flanged heads 51.

With the arrangement just described, it has been found that the steering system is reversible to an extent not heretofore experienced in power steering; indeed, the return of the dirigible wheels of the vehicle to straight ahead position on completion of a turn is substantially as positive and rapid as in the case of a conventional mechanical steering gear.

The pre-loading of the centering springs is arbitrary and depends upon the degree of assist desired. In the usual case the pre-loading is equivalent to from 4 to 8 pounds of manual turning effort at the rim of the steering wheel. Thus, the incidental steering necessary at highway cruising speeds, when steering resistance is low, may be done manually without a power assist, the piston 22 functioning merely as a conventional ball nut.

What we claim is:

1. In a power steering gear having a fixed member and including a control member, a fluid motor operatively connected to a steering element, a source of fluid pressure for said motor and a control valve therefor, said valve being actuated by reactionary axial thrust of said control member and comprising yieldable means tending to maintain the same in a neutral position, said means in operation of the gear being reflected as steering feel, the combination of a thrust bearing for said control member comprising a pair of outer ball races and an inner ball race axially movable with said member and connected to said valve to directly actuate the same, said inner ball race having yieldable means associated therewith tending to maintain said member in a predetermined axial position corresponding to the neutral position of said valve, said last mentioned yieldable means taking the form of two sets of coil springs arranged radially about said control member with their axes paralleling that of said control member, means mounting one of said sets on said inner ball race serving to resist axial movement of said control member in one direction, means mounting the other set against said inner ball race and said fixed member for resisting axial movement of said control member in the opposite direction.

2. In a power steering gear having a fixed member and including a steering shaft, a fluid motor operatively connected to a steering element, a source of fluid pressure for said motor and a control valve therefor, said valve being actuated by reactionary axial thrust of said steering shaft and comprising yieldable means tending to maintain the same in a neutral position, said means in operation of the gear being reflected as steering feel, the combination of a thrust bearing for said steering shaft comprising a pair of outer ball races and an inner ball race axially movable with said steering shaft and connected by lever means to said valve to directly actuate the same, said inner ball race having yieldable means associated therewith tending to maintain said steering shaft in a predetermined axial position corresponding to the neutral position of said valve, said last mentioned yieldable means taking the form of two sets of coil springs arranged radially about said steering shaft with their axes paralleling that of said steering shaft, means mounting one of said sets on said inner ball race serving to resist axial movement of said steering shaft in one direction, means mounting the other set for reacting against said inner ball race and said fixed member for resisting axial movement of said steering shaft in the opposite direction.

3. In a power steering gear having a fixed member and including a manually operated control member adapted for limited axial movement, motor means operatively connected to a steering element, and control means for said motor means, the combination of a thrust bearing for said member comprising a pair of outer races and an inner race axially movable with said member and connected to said control means to directly actuate the same, said inner ball race having yieldable means associated therewith tending to maintain said member in a predetermined axial position corresponding to the neutral position of said control means, said yieldable means taking the form of two sets of coil springs arranged radially about said member with their axes paralleling that of said member, means mounting one of said sets on said inner ball race serving to resist axial movement of said member in one direction, means mounting the other set for reacting against said inner ball race and said fixed member for resisting axial movement of said member in the opposite direction.

References Cited in the file of this patent

UNITED STATES PATENTS

| | | |
|---|---|---|
| 2,063,937 | Kundig | Dec. 15, 1936 |
| 2,213,271 | Davis | Sept. 3, 1940 |
| 2,410,049 | Davis | Oct. 29, 1946 |
| 2,605,854 | MacDuff | Aug. 5, 1952 |
| 2,627,187 | Davis | Feb. 3, 1953 |
| 2,682,778 | Creson et al. | July 6, 1954 |
| 2,710,596 | Folkerts | June 14, 1955 |